(12) United States Patent
Kim et al.

(10) Patent No.: US 12,001,509 B2
(45) Date of Patent: Jun. 4, 2024

(54) FAST ADAPTIVE OPTIMIZATION

(71) Applicant: Google LLC, Mountain View, CA (US)

(72) Inventors: Seungyeon Kim, New York, NY (US);
Jingzhao Zhang, Cambridge, MA (US);
Andreas Veit, New York, NY (US);
Sanjiv Kumar, Jericho, NY (US);
Sashank Reddi, Jersey City, NJ (US);
Praneeth Karimireddy, Renens (CH)

(73) Assignee: GOOGLE LLC, Mountain View, CA (US)

( * ) Notice: Subject to any disclaimer, the term of this patent is extended or adjusted under 35 U.S.C. 154(b) by 963 days.

(21) Appl. No.: 16/821,509

(22) Filed: Mar. 17, 2020

(65) Prior Publication Data

US 2021/0295201 A1    Sep. 23, 2021

(51) Int. Cl.
    *G06N 20/00*    (2019.01)
    *G06F 17/18*    (2006.01)
    *G06F 18/21*    (2023.01)
    *G06N 3/084*    (2023.01)

(52) U.S. Cl.
    CPC ............ *G06F 17/18* (2013.01); *G06F 18/217* (2023.01); *G06N 20/00* (2019.01); *G06N 3/084* (2013.01)

(58) Field of Classification Search
    None
    See application file for complete search history.

(56) References Cited

PUBLICATIONS

Pichapati, V. et al., "AdaCliP: adaptive clipping for private SGD," downloaded from <arxiv.org/abs/1908.07643> (Oct. 23, 2019) 19 pp. (Year: 2019).*
Zhang, J. et al., "Why adam beats SGD for attention models," downloaded from <arxiv.org/abs/1912.03194v1> (Dec. 6, 2019) 20 pp. (Year: 2019).*
Thakkar, O. et al., "Differentially private learning with adaptive clipping," downloaded from <arxiv.org/abs/1905.03871v1> (May 9, 2019) 9 pp. (Year: 2019).*
Li, Q. et al., "Stochastic modified equations and adaptive stochastic gradient descent algorithms," Intl. Conf. on Machine Learning (2017) 10 pp. (Year: 2017).*
Agarwal et al., "The case for full-matrix adaptive regularization", arXiv:1806v1, Jun. 8, 2018, 16 pages.

(Continued)

*Primary Examiner* — Brian M Smith
(74) *Attorney, Agent, or Firm* — DORITY & MANNING P.A.

(57) ABSTRACT

Generally, the present disclosure is directed to systems and methods that perform adaptive optimization with improved convergence properties. The adaptive optimization techniques described herein are useful in various optimization scenarios, including, for example, training a machine-learned model such as, for example, a neural network. In particular, according to one aspect of the present disclosure, a system implementing the adaptive optimization technique can, over a plurality of iterations, employ an adaptive per coordinate clipping threshold to clip a current first moment of the coordinate to obtain a current update value that enables faster convergence for the machine-learned model when the noise in the stochastic gradients is heavy tailed.

20 Claims, 10 Drawing Sheets

(56) References Cited

PUBLICATIONS

Armijo, "Minimization of functions having Lipschitz continuous first partial derivatives", Pacific Journal of Mathematics, vol. 16, No. 1, 1966, 4 pages.

Bubeck et al., "Bandits with heavy tail", arXiv:1209v1, Sep. 8, 2012, 14 pages.

Chen et al., "On the convergence of a class of adam-type algorithms for non-convex optimization", arXiv:1808v2, Mar. 10, 2019, 30 pages.

Devlin et al., "Bert: Pre-training of deep bidirectional transformers for language understanding", arXiv:1820v2. May 24, 2019, 16 pages.

Duchi et al., "Adaptive subgradient methods for online learning and stochastic optimization", Journal of Machine Learning Research, vol. 12, 2011, pp. 2121-2159.

Hazan et al., "Beyond convexity: Stochastic quasi-convex optimization", arXiv:1507v1, Jul. 8, 2015, 23 pages.

Kingma et al., "ADAM: A method for stochastic optimization", arXiv:1412v9, Jan. 30, 2017, 15 pages.

Lacoste-Julien et al., "A simpler approach to obtaining an o (1/t) convergence rate for the projected stochastic subgradient method", arXiv:1212v2, Dec. 20, 2012, 8 pages.

Levy, "The power of normalization: Faster evasion of saddle points", arXiv:1611v1, Nov. 15, 2016. 33 pages.

Li et al., "On the convergence of stochastic gradient descent with adaptive Stepsizes", arXiv:1805v3, Feb. 26, 2019.

Merity et al., "Regularizing and optimizing LSTM language models", arXiv:1708v1, Aug. 7, 2017, 10 pages.

Panigrahi et al., "Non-gaussianity of stochastic gradient noise", arXiv:1910v2, Oct. 25, 2019, 11 pages.

Polyak, "Introduction to optimization", Optimization Software, Inc. Publications Division, New York, 265 pages.

Reddi et al., "On the convergence of ADAM and beyond", arXiv:1904v1, Apr. 19, 2019, 23 pages.

Robbins et al., "A stochastic approximation method", Annals of Mathematical Statistics, vol. 22, 1951, pp. 400-407.

Simsekli et al., "A tail-index analysis of stochastic gradient noise in deep neural networks", arXiv:1901v1, Jan. 18, 2019, 14 pages.

Staib et al., "Escaping saddle points with adaptive gradient methods", arXiv:1901v2, Feb. 3, 2020, 45 pages.

Vaswani et al., "Attention is all you need", arXiv:1706v5, Dec. 6, 2017, 15 pages.

Ward et al., "Adagrad stepsizes: Sharp convergence over nonconvex landscapes, from any initialization", arXiv:1806v1, Jun. 5, 2018, 15 pages.

Wilson et al., "The marginal value of adaptive gradient methods in machine learning", arXiv:1705v2, May 22, 2018, 14 pages.

Zhang et al., "Analysis of gradient clipping and adaptive scaling with a relaxed smoothness condition", arXiv:1905v1, May 28, 2019, 18 pages.

Zhou et al., "On the convergence of adaptive gradient methods for nonconvex optimization", arXiv:1808v3. Oct. 19, 2020, 30 pages.

Zhou et al. "Adashift: Decorrelation and convergence of adaptive learning rate methods", arXiv:1810v4, Jun. 24, 2019, 27 pages.

Zou et al. "On the convergence of weighted adagrad with momentum for training deep neural networks". arXiv:1808v1, Aug. 10, 2018, 19 pages.

Zou et al., "A sufficient condition for convergences of adam and rmsprop", arXiv:1811v3, Jun. 25, 2019, 24 pages.

* cited by examiner

| | STRONGLY CONVEX FUNCTION | | NON-CONVEX FUNCTION | |
|---|---|---|---|---|
| | HEAVY-TAILED NOISE ($\alpha \in (1,2)$) | STANDARD NOISE ($\alpha \geq 2$) | HEAVY-TAILED NOISE ($\alpha \in (1,2)$) | STANDARD NOISE ($\alpha \geq 2$) |
| SGD | N/A | $G^2 k^{-1}$ | N/A | $Gk^{-\frac{1}{2}}$ |
| GCLIP | $G^2 k^{\frac{-2(\alpha-1)}{\alpha}}$ | $G^2 k^{-1}$ | $G^{\frac{2\alpha}{2\alpha-2}} k^{\frac{-2(\alpha-2)}{2\alpha-2}}$ | $Gk^{-\frac{1}{2}}$ |
| CCLIP | $\|B\|_2^2 k^{\frac{-2(\alpha-1)}{\alpha}}$ | $\|B\|_2^2 k^{-1}$ | $\|B\|_2^{\frac{2\alpha}{2\alpha-2}} k^{\frac{-2(\alpha-1)}{2\alpha-2}}$ | $\|B\|_2 k^{-\frac{1}{2}}$ |
| LOWER-BOUND | $\Omega(k^{\frac{-2(\alpha-1)}{\alpha}})$ | $\Omega(k^{-1})$ | ? | ? |

FIG. 5

|  | BERT BASE 6 LAYERS | | BERT BASE 12 LAYERS | | BERT LARGE 24 LAYERS | |
|---|---|---|---|---|---|---|
|  | VAL. LOSS | ACCURACY | VAL. LOSS | ACCURACY | VAL. LOSS | ACCURACY |
| ADAM | 1.907 | 63.45 | 1.718 | 66.44 | 1.432 | 70.56 |
| ACCLIP | 1.877 | 63.85 | 1.615 | 67.16 | 1.413 | 70.97 |

FIG. 6A

|  | BERT BASE 6 LAYERS | | BERT BASE 12 LAYERS | | BERT LARGE 24 LAYERS | |
|---|---|---|---|---|---|---|
|  | EM | F1 | EM | F1 | EM | F1 |
| ADAM (DEVLIN ET AL. 2018) |  |  | 80.8 | 88.5 | 84.1 | 90.9 |
| ADAM | 76.85±0.34 | 84.79±0.33 | 81.42±0.16 | 88.61±0.11 | 83.94±0.19 | 90.87±0.12 |
| ACCLIP | 78.07±0.24 | 85.87±0.13 | 81.62±0.18 | 88.82±0.10 | 84.93±0.29 | 91.40±0.15 |

FIG. 6B

FAST ADAPTIVE OPTIMIZATION

FIELD

The present disclosure generally relates to systems and methods to solve optimization problems, such as training a machine-learned model. More particularly, the present disclosure relates to adaptive optimization techniques with improved convergence properties.

BACKGROUND

Machine-learned models such as artificial neural networks typically include a number of parameters. In various machine learning techniques, the final values of the parameters are learned through an iterative training process which updates the parameters at each of a plurality of training iterations. For example, at each iteration, the performance of the model relative to a set (e.g., a "minibatch") of training data is evaluated using a loss function. The parameters can be updated based on the performance of model as evaluated by the loss function.

The degree or amount by which the parameters of the model are updated at each iteration can be controlled by or otherwise performed in accordance with an effective learning rate. For example, a relatively smaller effective learning rate will typically result in relatively smaller changes to the values of the parameters, while a relatively larger effective learning rate will typically result in relatively larger changes to the values of the parameters at that iteration.

Stochastic gradient descent (SGD) is one of the dominant methods used today to train deep neural networks. This method iteratively updates the parameters of a model by moving them in the direction of the negative gradient of the loss evaluated on a minibatch of training data.

Though a well-tuned SGD outperforms adaptive methods in many traditional tasks such as ImageNet classification, certain tasks necessitate the use of adaptive variants of SGD such as, Adam, AMSGrad, which employ adaptive per-parameter learning rates. For instance, consider the task of training an attention model using BERT. It can be observed that in spite of extensive hyperparameter tuning, SGD converges much slower than Adam.

While these algorithms have been successfully employed in several practical applications, they have also been observed to not converge in certain settings such as strongly convex functions with heavy tailed noise. For example, in the heavy-tailed noise setting, some stochastic gradients can be much larger than the mean and can excessively influence the SGD updates. This makes SGD unstable and leads to its poor performance.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for optimizing machine-learned models with improved convergence properties. The method includes determining, by one or more computing devices, a gradient of a loss function that evaluates a performance of a machine-learned model that comprises a plurality of parameters, wherein the gradient of the loss function comprises a plurality of coordinates that respectively correspond to the plurality of parameters. The method includes determining, by the one or more computing devices, a respective adaptive per-coordinate threshold for each of the plurality of coordinates of the gradient of the loss function, wherein the respective adaptive per-coordinate threshold for each coordinate is based at least in part on a previous adaptive per-coordinate threshold for the coordinate and the gradient of the loss function. The method includes clipping, by the one or more computing devices, a respective current first moment for each of the plurality of coordinates of the gradient of the loss function based at least in part on the respective adaptive per-coordinate threshold for the coordinate to obtain a current update value for the coordinate. The method includes determining, by the one or more computing devices, an updated set of values for the plurality of parameters of the machine-learned model based at least in part on a respective previous value for each of the plurality of parameters, the current update value for each coordinate, and a learning rate. The method includes outputting, by the one or more computing devices, the machine-learned model as a trained model having the updated set of values for the plurality of parameters of the machine-learned model.

Another example aspect is directed to a computer system that includes one or more processors; and one or more non-transitory computer-readable media that store instructions that, when executed by the one or more processors, cause the one or more processors to perform operations. The operations include determining a gradient of a loss function that evaluates a performance of a machine-learned model that comprises a plurality of parameters, wherein the gradient of the loss function comprises a plurality of coordinates that respectively correspond to the plurality of parameters. The operations include determining a respective adaptive per-coordinate threshold for each of the plurality of coordinates of the gradient of the loss function, wherein the respective adaptive per-coordinate threshold for each coordinate is based at least in part on a previous adaptive per-coordinate threshold for the coordinate and the gradient of the loss function. The operations include clipping a respective current first moment for each of the plurality of coordinates of the gradient of the loss function based at least in part on the respective adaptive per-coordinate threshold for the coordinate to obtain a current update value for the coordinate. The operations include determining an updated set of values for the plurality of parameters of the machine-learned model based at least in part on a respective previous value for each of the plurality of parameters, the current update value for each coordinate, and a learning rate.

Another example aspect is directed to one or more non-transitory computer-readable media that store a machine-learned model that has been trained through execution of operations. The operations include, for each of a plurality of iterations: determining a gradient of a loss function that evaluates a performance of the machine-learned model that comprises a plurality of parameters, wherein the gradient of the loss function comprises a plurality of coordinates that respectively correspond to the plurality of parameters; determining a respective adaptive per-coordinate threshold for each of the plurality of coordinates of the gradient of the loss function, wherein the respective adaptive per-coordinate threshold for each coordinate is based at least in part on a previous adaptive per-coordinate threshold for the coordinate and the gradient of the loss function; clipping a respective current first moment for each of the plurality of coordinates based at least in part on the respective adaptive per-coordinate threshold for the coordinate to obtain a current update value for the coordinate; and determining an updated set of values for the plurality of parameters of the machine-learned model based at least in part on a respective previous value for each of the plurality of parameters, the current update value for each coordinate, and a learning rate.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 5 depicts example experimental results according to example embodiments of the present disclosure.

FIGS. 6A-B depict example experimental results according to example embodiments of the present disclosure.

Figure 1A:
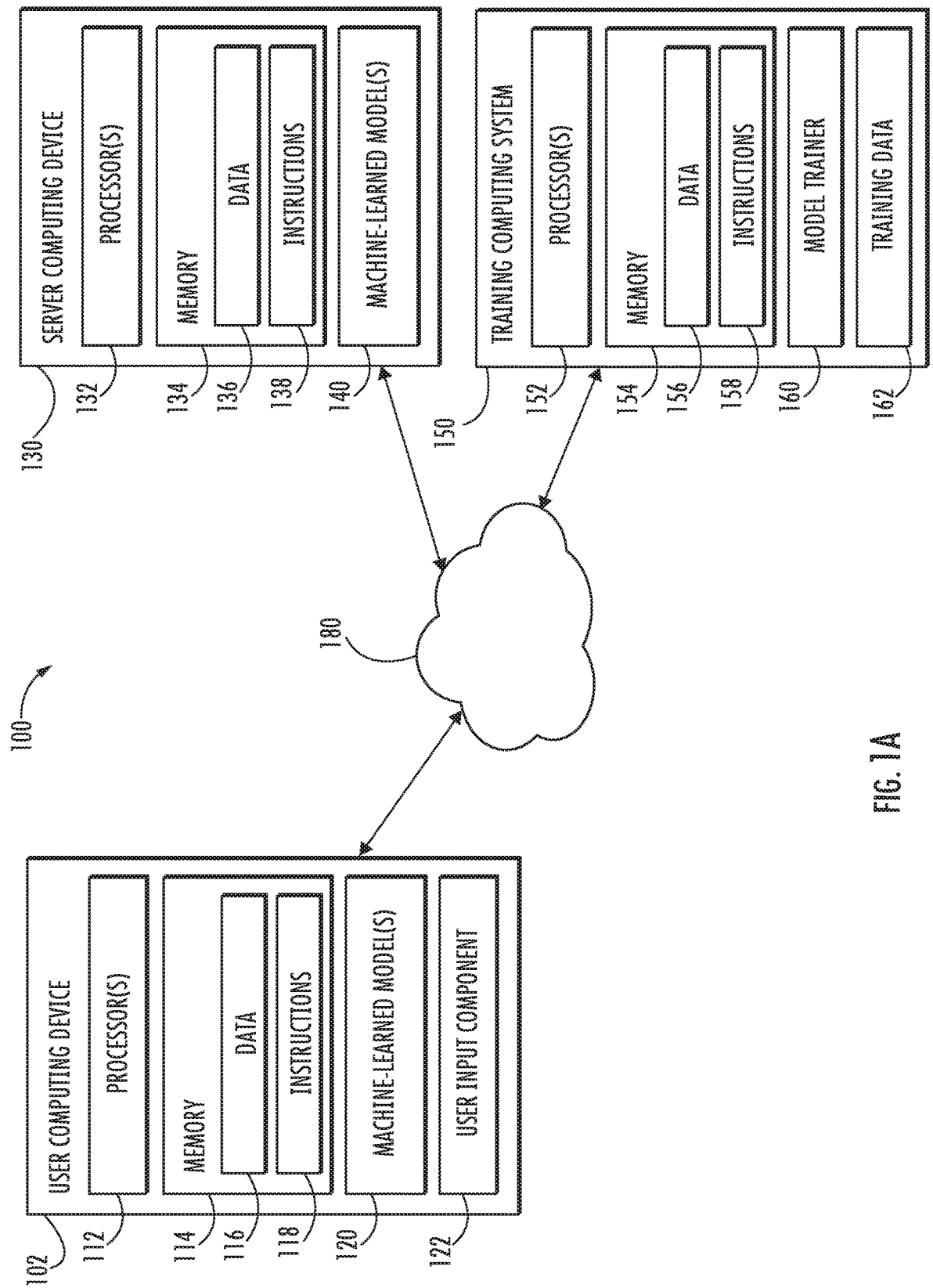
FIG. 1A depicts a block diagram of an example computing system according to example embodiments of the present disclosure.

Reference numerals that are repeated across plural figures are intended to identify the same features or components in various implementations.

DETAILED DESCRIPTION

Generally, the present application is directed to systems and methods that perform adaptive optimization with improved convergence properties. The adaptive optimization techniques herein are useful in various optimization scenarios, including, for example, training a machine-learned model, such as, for example, a neural network. In particular, according to one aspect of the present disclosure, a computing system implementing the adaptive optimization techniques described herein can, over a plurality of iterations, employ an adaptive per-coordinate gradient clipping threshold to ensure faster convergence, particularly when the noise in stochastic gradients is heavy tailed. As one example, some of the adaptive optimization techniques proposed by the present disclosure can clip, at each of the plurality of iterations, the respective current first moment of each coordinate of the gradient of a loss function based in part on the respective adaptive per-coordinate threshold for the coordinate. The proposed adaptive optimization techniques can use the respective clipped current first moment to determine a current update value for the respective coordinate of the gradient of the loss function. Using the current update value for each coordinate, a learning rate, and a previous value of the plurality of coordinates for each of the parameters, the adaptive optimization techniques can determine an updated set of values for the parameters of the machine-learned model. Using the current first moment for each coordinate, including the clipped current first moments for some coordinates, the system can determine a current and updated gradient of the loss function without being excessively influenced by those coordinates with large variances. The systems and methods of the present disclosure provide guaranteed convergence when the noise is heavy tailed, converging faster than certain existing techniques, and providing superior generalization capacity. Faster convergence during training can result in savings of computer resources such as conservation of processor usage, memory usage, and/or network bandwidth.

According to aspects of the present disclosure, the respective adaptive per-coordinate threshold for each of the plurality of coordinates of the gradient of the loss function can be determined based on one or more previous adaptive per-coordinate thresholds for the coordinate and an exponential moving average of past gradients raised to an alpha moment value.

In some examples, the respective adaptive per-coordinate threshold for each of the plurality of coordinates of the gradient of the loss function can be determined based on a sum of an exponential average of past and current gradients and a previous adaptive per-coordinate threshold. Using values of alpha moment=(1,2] to determine the adaptive per-coordinate threshold to clip the respective current first moment of the coordinate places a conservative bound on the exponential moving average of past gradients. In some examples, the respective adaptive per-coordinate threshold for each of the plurality of coordinates of the gradient of the loss function can be determined based on a square root of the exponential moving average of the square of the past gradients for said coordinate.

According to aspects of the present disclosure, a computing system implementing the example adaptive coordinate-wise clipping techniques described herein can determine a respective current first moment based at least in part on one or more previous respective current first moments for the coordinate and the gradient of the loss function. The computing system implementing the example adaptive per-coordinate clipping techniques described herein can clip the respective current first moment for the coordinate based at least in part on the respective adaptive per-coordinate threshold to obtain a current update value for the coordinate. In some examples, if the respective adaptive per-coordinate threshold divided by a value indicative of the current first moment for said coordinate is less than 1, the current first moment value can be clipped by setting the current update value for the coordinate equal to the respective adaptive per-coordinate threshold for the coordinate times the respective current first moment divided by the value indicative of the respective current first moment for the coordinate. Thus, if a coordinate of the gradient of the loss function has a large variance or excessively influences the update to the gradient of the loss function, the respective first current moment for that coordinate can be clipped using the respective adaptive per-coordinate threshold by setting the current update value for the coordinate equal to the respective adaptive per-coordinate threshold for the coordinate time the respective current first moment divided by the value indicative of the respective current first moment for the coordinate. In some examples, if the respective adaptive per-coordinate threshold divided by a value indicative of the current first moment for said coordinate is greater than 1, the first current moment value is not clipped by setting the current update value for said coordinate equal to the current first moment for said coordinate.

More particularly, although SGD performs very well in many training tasks such as ImageNet classification, often outperforming more adaptive methods such as Adam, AMS-Grad, its performance deteriorates in certain tasks that necessitate the use of adaptive methods that employ adaptive per parameter learning rates. For example, in settings where the gradient noise norm is heavy tailed, it is necessary to use adaptive techniques to stabilize updates because in such settings, some stochastic gradients can be much larger than the mean and can excessively influence the SGD updates. This makes SGD unstable and leads to its poor performance, with non-convergence in certain situations, e.g., strongly convex function with heavy tailed noise.

As demonstrated herein, one cause for such poor performance is the excessive influence of some gradients on the SGD updates. In the sections below, the present disclosure provides an explicit example of an optimization setting where SGD performance degrades, and previous convergence proof fails. Further, the present disclosure provides an explicit example of training a neural network with heavy-tailed noise where the algorithm proposed in the present disclosure outperforms the Adam algorithm.

According to an aspect of the present disclosure, the systems and methods provided herein fix the issues mentioned above by adaptive coordinate-wise clipping for each iteration. To that end, the present disclosure proposes a novel adaptive-threshold coordinate-wise clipping algorithm to clip the variances (e.g., a first moment for a coordinate) of those coordinates of the gradient of the loss function that have a large variance to stabilize the gradient updates adaptively.

According to some aspects of the present disclosure, a computing system implementing the example adaptive per-coordinate clipping techniques described herein, can update a set of values for a plurality of parameters of the machine-learned models being optimized based at least in part on the previous values of the plurality of parameters, the current update value for each coordinate of the gradient of the loss function and a learning rate. In some examples, the learning rate can be constant. For example, the system can adaptively determine the coordinate-wise clipping threshold and a constant step-size or learning rate. Using a simpler update scheme involving a constant learning rate avoids scenarios wherein the learning rate decreases or increases iteration-over-iteration. Some optimization algorithms like Adam, RMSProp, etc., use a decreasing learning rate to update the values of the plurality of parameters. However, a simpler update scheme allows ACClip to take larger steps that Adam or other optimization algorithms and hence converge slightly faster.

The convergence guarantee for SGD breaks when the stochastic gradient descent does not have a bounded second moment, for e.g., in tasks with heavy tailed noise norm. To ensure convergence, the present disclosure suggests clipping the stochastic gradients for those coordinates with large variances. While clipping does introduce more bias, in some examples, the clipping threshold can be tuned to trade-off between the variance and the bias. For example, smaller threshold values for clipping imply larger bias. In examples where the noise is heavy tailed, the bias introduced by clipping can be offset by picking a smaller threshold. As another example, if the noise is heavy tailed with respect to only certain coordinates of the gradient of the loss function, aspects of the present disclosure that provide adaptive coordinate-wise clipping can clip only those coordinates which are more heavy tailed and converge faster. Thus, adaptive coordinate-wise clipping can converge faster in situations where noise is heavy tailed only for certain coordinates by clipping the variance of only those coordinates with heavy tailed noise norm. Thus, the optimization techniques described herein can provide the benefits of use of an adaptive learning rate, while avoiding certain scenarios in which existing adaptive optimization techniques fail to converge (e.g., scenarios which result in learning rates that are not monotonically non-increasing). The systems and methods of the present disclosure provide a number of technical effects and benefits, including, as examples, providing guaranteed convergence, while also reducing the number of hyperparameters, converging faster than certain existing techniques, and providing superior generalization capacity.

Faster and guaranteed convergence, as provided by the techniques described herein, has a number of technical benefits. As examples, faster convergence means that the training operations require less memory usage, less processor usage, and decreased peak processor requirements. Guaranteed convergence provides more certainty and efficiency in scheduling multiple jobs.

Example implementations of aspects of the present disclosure will now be discussed in further detail. The example algorithms and other mathematical expressions provided below are examples of possible ways to implement aspects of the present disclosure. The systems and methods of the present disclosure are not limited to the example implementations described below.

Example Optimization Setup

A flexible and example framework to analyze iterative optimization methods is neural network training with heavy tailed noise. In such a network, neural network training can be seen as minimizing a differentiable stochastic function $f(x)=\mathbb{E}_\xi[f(x,\xi)]$, where $f: \mathbb{R}^d \to \mathbb{R}$ can be potentially nonconvex. Each iteration of the training can assume access to an unbiased stochastic gradient $g(x)=\nabla f(x,\xi)$ corresponding to the parameters x, and also assume finite $\alpha$ moment.

Assumption 1—There exists positive real numbers $\alpha \in (1, 2]$ and $G>0$ such that for all x, $\mathbb{E}[\|g(x)\|^\alpha] \le G^\alpha$. Assumption 1 is a weaker assumption than the standard bounded second moment assumption. The possibility that the variance could be unbounded has a profound impact on the optimization process. In some examples, the variance of g(x) is unbounded while simultaneously satisfying the above assumption for $\alpha<2$, e.g. the Pareto distribution. More particularly, in some examples, previous convergence proofs for SGD fail due to the $\mathbb{E}[\|g\|^2]$ in the inequality. One way to overcome the problem of unbounded variance, while ensuring convergence even under heavy-tailed noise, is to adaptively clip the heavy tailed coordinates of the gradient.

Example Discussion of Generic Gradient Based Algorithms

A framework of gradient based algorithms is now provided that gives insights into the differences between different gradient based optimization algorithms and is useful for understanding the flaws in a few popular methods when the gradient noise norm is heavy tailed. Algorithm 1 provides an example of a general SGD framework that encapsulates clipping.

Algorithm 1: Example Gradient Based Optimization
Setup
x, $m_k \leftarrow x_0$, 0
for k=1, ·, T do $m_k \leftarrow \beta_1 m_{k-1} + (1-\beta_1) g_k$ $\hat{g}_k \leftarrow \text{clip}(\tau_k, m_k)$ $x_k \leftarrow x_{k-1} - \eta_k \hat{g}_k$ end for
return $x_K$, where random variable K is supported on $\{1, \ldots, T\}$.

However, with heavy tailed noise norms in gradients, in some examples, SGD convergence breaks down. For example, when the stochastic gradient does not have bounded second moment, the optimization solution in SGD breaks down and does not converge. One way to control the variance is by clipping the stochastic gradients. While clipping the gradient introduces some additional bias, the clipping threshold can be (possibly adaptively) tuned to trade-off variance with the introduced bias.

Some example clipping mechanisms are Global Clipping where a single global threshold is used for all the coordinates of the gradient and Coordinate-wise Clipping using d coordinate-wise thresholds for each respective coordinate of the gradient. GClip and CClip can be described using Algorithm 1 by replacing the clipping step as follows.

$$GClip(\tau_k, m_k) = \min\left\{\frac{\tau_k}{\|m_k\|}, 1\right\} m_k, \tau_k \in \mathbb{R}_{\geq 0} \quad \text{(GClip)}$$

$$CClip(\tau_k, m_k) = \min\left\{\frac{\tau_k}{|m_k|}, 1\right\} m_k, \tau_k \in \mathbb{R}_{\geq 0}^d. \quad \text{(CClip)}$$

where all operations for CClip are performed element-wise.

While GClip preserves the update direction and only scales its magnitude, GClip scales the magnitude across all the coordinates of the gradient, irrespective of whether a respective coordinate is heavy tailed. On the other hand, while CClip may not preserve the direction of the gradient, but since CClip scales each coordinate individually, CClip can be configured to clip only the variance of those coordinates whose noise distribution varies significantly. However, to perform such a coordinate-wise variance-bias trade off optimally would require tuning all d thresholds, which could be extremely large in deep learning. Even if tuning were feasible, the noise distribution may be non-stationary and significantly vary as training progresses.

To address this challenge, the present disclosure proposes Adaptive Coordinate-wise Clipping, which adaptively sets the thresholds for each coordinate for each iteration of the training.

$$ACClip(\tau_k, m_k) = \min\left\{\frac{\tau_k}{|m_k|+\epsilon}, 1\right\} m_k, \tau_k^\alpha = \beta_2 \tau_{k-1}^\alpha + (1-\beta_2)|g_k|^\alpha,$$

where operations are element-wise, $\epsilon$ is a small number for numerical stability, and $\alpha$ can be set $\alpha=1$ by default. The use of a coordinate-wise $\alpha$-moment (as opposed to the traditional second moment) estimates $B = [|g_k^\alpha|]^{1/\alpha}$ in Assumption 1. Since $[|g_k^\alpha|]^{1/\alpha}$ is increasing in $\alpha \geq 1$, using $\alpha=1$ is a conservative bound on B when the true $\alpha$ is unknown. Smaller threshold values of $\tau_k$ imply smaller variance, but also higher bias. If the noise distribution is very heavy-tailed (or has a large variance), one could compensate by picking a smaller threshold. A value of $\beta_1=0.9$ and $\beta_2=0.999$ is typically recommended in practice.

In some examples, Adam without momentum implicitly behaves as ACClip without momentum. For instance, when $\beta_1=0$, the update for Adam and ACClip can be rewritten as SGD with effective step-sizes $h_{Adam}$ and $h_{clip}$ respectively $$x_{k+1} = x_k - \frac{\alpha}{\epsilon + \sqrt{\beta_2 v_k + (1-\beta_2)|g_k|^2}} g_k =: x_k - h_{Adam} g_k,$$

$$x_{k+1} = x_k - \eta_k \min\left\{\frac{\tau_k}{|g_k|}, 1\right\} g_k =: x_k - h_{clip} g_k.$$

Given any set of parameters for RMSProp, setting the parameters for ACClip as $$\eta_k = \frac{2\alpha}{\epsilon + \sqrt{\beta_2 v_k}}$$

and $$\tau_k = \frac{\epsilon + \sqrt{\beta_2 v_k}}{\sqrt{1-\beta_2}},$$

Results in $$\frac{1}{2} h_{clip} \leq h_{Adam} \leq 2 h_{clip}.$$

Thus, the two algorithms differ in coordinate-wise step size by at most a factor of 2 and Adam can be seen as ACClip where $\tau_k$ is set using $\sqrt{v_k}$, which estimates $[|g_k|^2]^{1/2}$, and a correspondingly decreasing step-size. While Adam uses an estimate of $[|g_k|^2]^{1/2}$, and a decreasing learning rate, ACClip uses a simpler update scheme where $\tau_k$ is set using an estimate of $[|g_k|]$ and a constant step-size. This allows ACClip to take larger steps than Adam and hence converge faster than Adam.

Example Discussion of Convergence of SGD

As will be shown below, gradient clipping, particularly when the gradient noise is heavy tailed, ensures convergence for both convex and non-convex functions. Gradient clipping can be an optimal strategy under strongly convex settings.

Example frameworks with strongly-convex functions and for smooth non-convex functions are described below. As an example, consider Theorem 1—that $f$ is a $\mu$-strongly convex function and the noise satisfies assumption 1. Then let $\{x_k\}$ be the iterates of Algorithm 1 using GClip, clipping parameter $\tau_k = Gk^{\alpha-1}$ and steps-size $$\eta_k = \frac{4}{\mu(k+1)}.$$

The output can be a j-weighted combination of the iterates:

$$\bar{x}_k = \sum_{j=1}^{k} j x_{j-1} / \left(\sum_{j=1}^{k} j\right).$$

Then the output $\bar{x}_k$ satisfies:

$$E[f(\bar{x}_k)] - f(x^*) \le \frac{16G^2}{\mu(k+1)^{2(\alpha-1)/\alpha}}.$$

Note that with $\alpha=2$ and with bounded second moment results in exactly the optimal SGD rate of $(G^2/\mu k)$. This rate is optimal for every $\alpha \in (1,2]$. For any other $\alpha \in (1,2)$, the performance of GClip gracefully degrades. Essentially, SGD's proof fails. Similarly, it can be understood that the rates of convergence recover to an optimal stationary point for smooth non-convex functions.

As another example, consider Theorem 2—$f$ is an L-smooth function and the noise satisfies assumption 1. Then let $\{x_k\}$ be the iterates of Algorithm 1 using GClip with momentum $\beta=0$, constant step-size $$\eta_k = \left[\left(\frac{f(x_0) - f^*}{G^2(K+1)}\right)^{\frac{\alpha}{3\alpha-2}} / L^{\frac{2\alpha-2}{3\alpha-2}}\right]$$

and constant clipping parameter $$\tau_k = G / (\eta L)^{\frac{1}{\alpha}}.$$

Then, the sequence $\{x_k\}$ satisfies $$\frac{1}{K}\sum_{k=1}^{K} [\nabla f(x_{k-1})^2] \le 4G^{\frac{2\alpha}{3\alpha-2}} * \left(\frac{f(x_0) - f(x^*)}{K}\right)^{\frac{2\alpha-2}{3\alpha-2}}.$$

The rates of convergence for the non-convex case exactly match those of the usual SGD rates of $(1/\sqrt{k})$ when $\alpha=2$ and gracefully degrades for $\alpha \in (1,2]$. Thus, GClip converges for both convex and non-convex functions under Assumption 1. However, Assumption 1 is quite crude and summarizes noise into a single number G. The noise present in the different gradient coordinates can be quite varied and summarizing the noise into a single number G does not consider the impact of only those coordinates whose variances are very large. However, CClip clips each coordinate independently, clipping only those coordinates whose variance is very large. This selective clipping allows CClip, if tuned properly, to have a significantly better and faster convergence when compared to GClip.

The previous examples assumed a global bound on the $\alpha$-moment of the norm of the stochastic gradient is bounded by G. However, there is a possibility that G might be hiding some dimension dependence d. A more detailed model of the noise is needed in order to understand this dependence. For example, consider Assumption 2: $\{g_i(x)\}$ to be the coordinate-wise gradients for $i \in [d]$. Assuming that there exist constants $\{B_i\} \ge 0$ and $\alpha \in (1,2]$ such that $E[|g_i(x)|^\alpha] \le B_i^\alpha$, denoting $B=[B_1; B_2; \ldots; B_d] \in \mathbb{R}^d$, $B_a = \Sigma B_i^a$. Under this more detailed assumption, it can be shown that if $f$ is $\mu$-strongly convex, then with appropriate step-sizes and averaging, the output $\bar{x}_k$ satisfies $$[f(\bar{x}_k)] - f(x^*) \le \frac{16d\|B\|_\alpha^2}{\mu(k+1)^{2(\alpha-1)/\alpha}}.$$

This convergence has a strong dependence on d which is a problem for deep networks with a large number of dimensions. Per coordinate clipping avoids such dimensional dependence. For example, consider Theorem 3—if we clip coordinate-wise under assumption 2 with $\tau_k = Bk^{\alpha-1}$ to obtain the sequence $\{x_k\}$, and if $f$ is $\mu$-strongly convex, with appropriate step-sizes and averaging, the output $\bar{x}_k$ satisfies $$[f(\bar{x}_k)] - f(x^*) \le \frac{16B_2^2}{\mu(k+1)^{2(\alpha-1)/\alpha}}.$$

Thus, per-coordinate clipping has a better dimensional dependence. This difference in the dependence is based on two sources: coordinate-wise clipping can adapt to different $B_i$ in each coordinate and the global $L_2$ clipping does not align with the geometry of coordinate-wise noise. A similar comparison between GClip and CClip for non-convex conditions yields similar results with CClip outperforming GClip.

As another example, consider Theorem 4—a problem $f$ which is 1-strongly convex and 1-smooth ($\mu=1$ and $L=1$), and stochastic gradients which satisfy Assumptions 1 and 2 with G, $\|B\| \le 1$ such that the output $x_k$ of the algorithm after processing k stochastic gradients has an error $$[f(x_k)] - f(x^*) \ge \Omega\left(\frac{1}{k^{2(\alpha-1)/\alpha}}\right)$$

for any $\alpha \in (1,2]$ and any (possibly randomized) algorithm.

As disclosed herein, a strong lower-bound for the class of strongly convex functions with stochastic gradients satisfying $[|g(x)|^\alpha] \le 1$ matches the upper bounds of Theorems 1 and 2 for strongly-convex functions, showing that the simple clipping mechanism of Algorithm 1 is (up to constants) theoretically optimal, providing a strong justification for its use.

Example Devices and Systems

FIG. 1A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touchpad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, training data divided into a number of minibatches. The model trainer 160 can perform any of the optimization techniques described herein including, as examples, Algorithm 1 and any variants described herein using any of the clipping techniques described herein.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
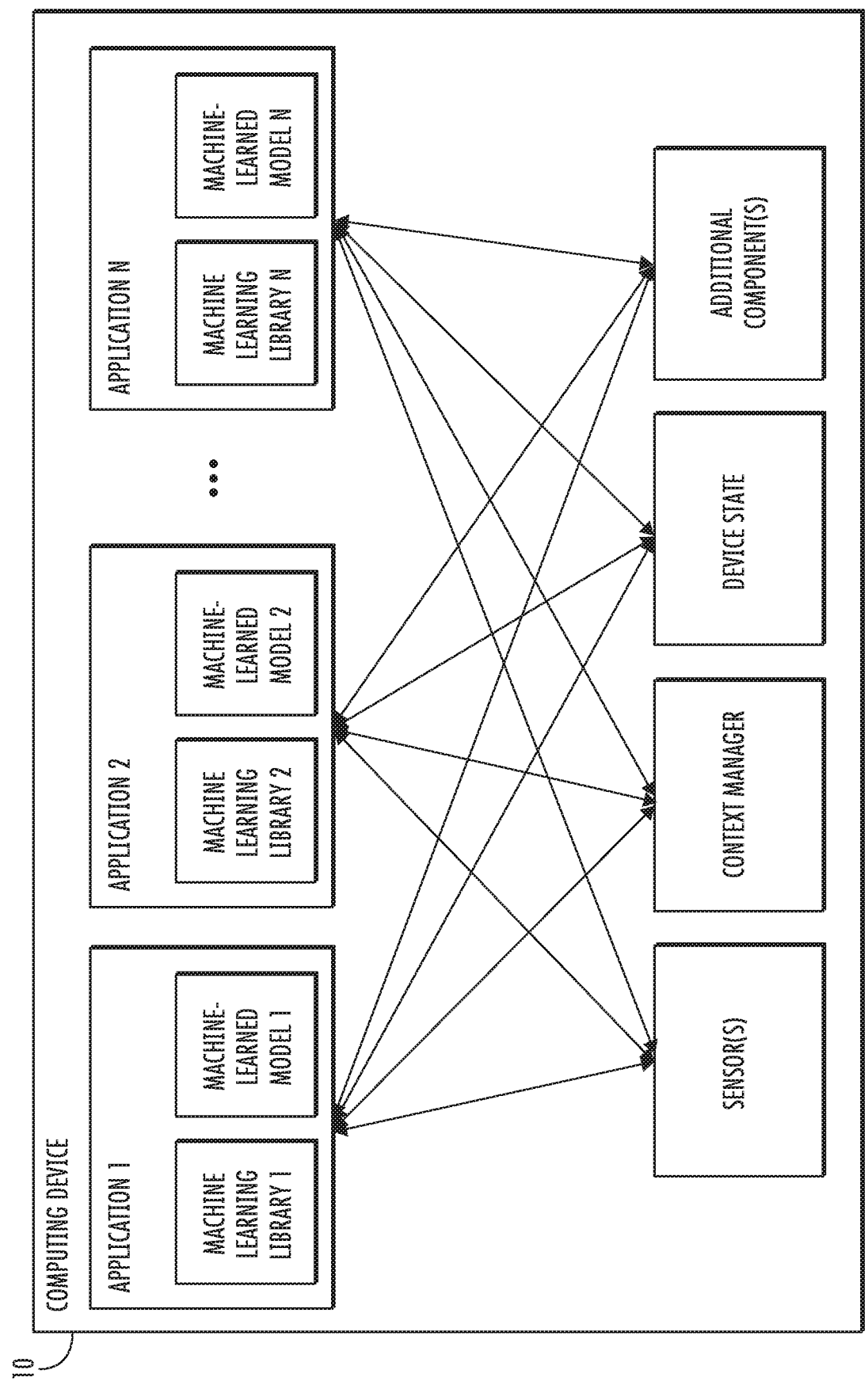
FIG. 1B depicts a block diagram of an example computing device according to example embodiments of the present disclosure.

FIG. 1B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
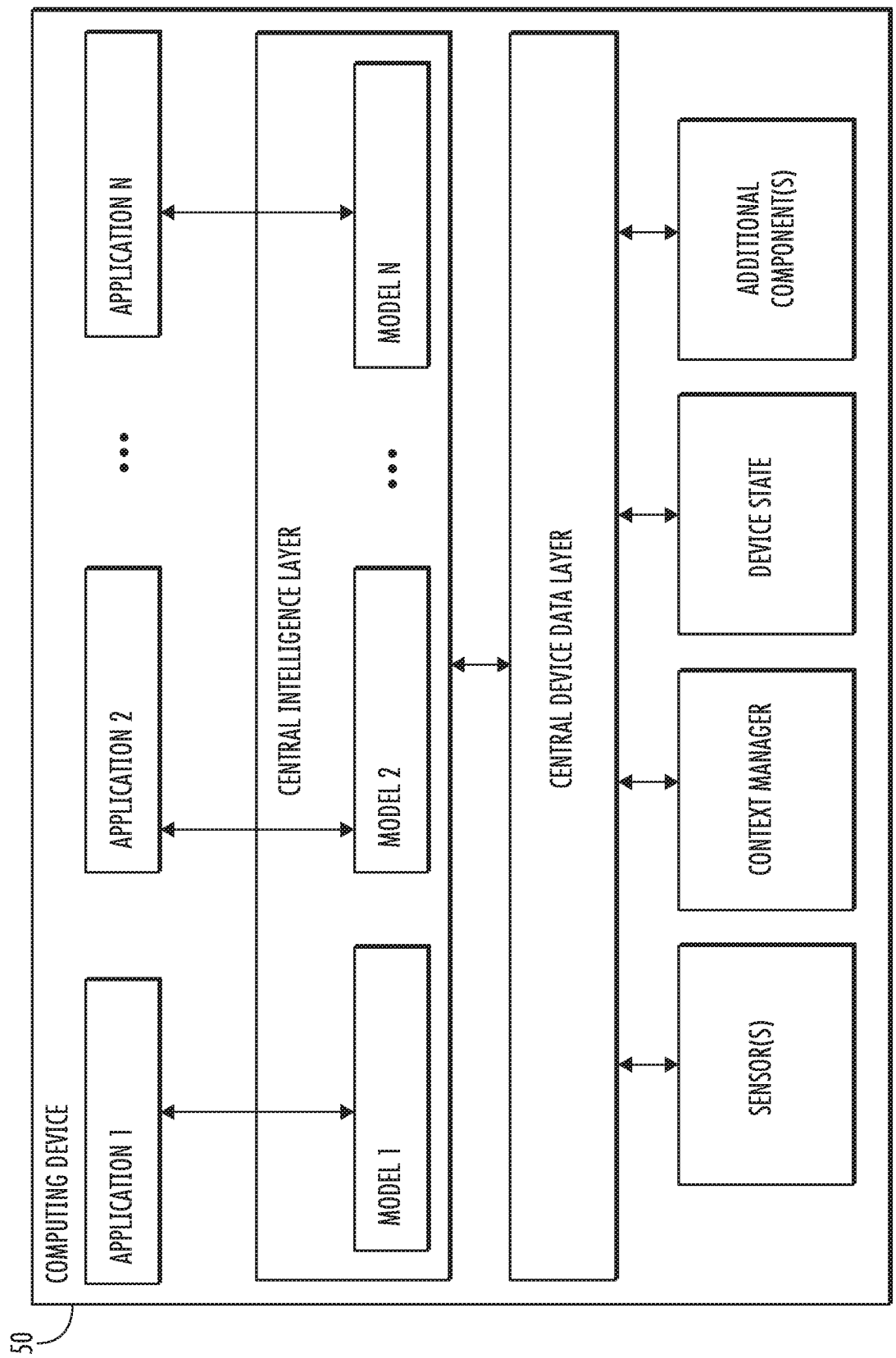
FIG. 1C depicts a block diagram of an example computing device according to example embodiments of the present disclosure.

FIG. 1C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 2:
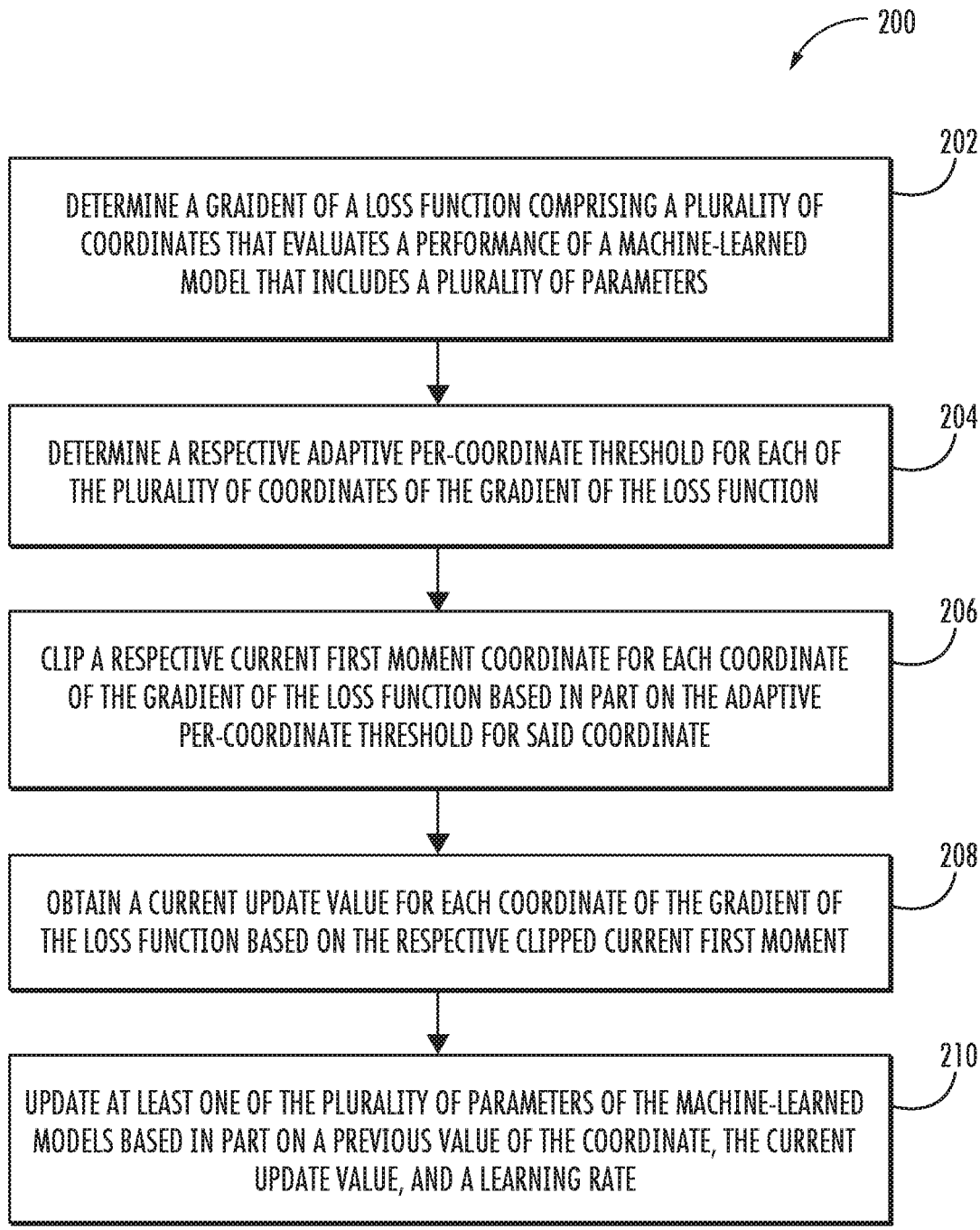
FIG. 2 depicts a flow chart diagram of an example method to optimize machine-learned models according to example embodiments of the present disclosure.

FIG. 2 depicts a flow chart diagram of an example method to perform according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system can determine a gradient of a loss function that evaluates a performance of a machine-learned model that comprises a plurality of parameters, wherein the gradient of the loss function comprises a plurality of coordinates that respectively correspond to the plurality of parameters.

At 204, the computing system can determine a respective adaptive per-coordinate threshold for each of the plurality of coordinates of the gradient of the loss function, wherein the respective adaptive per-coordinate threshold for each coordinate is based at least in part on a previous adaptive per-coordinate threshold for the coordinate and the gradient of the loss function. For example, in some implementations, determining the respective adaptive per-coordinate threshold for each of the plurality of coordinates of the gradient of the loss function comprises determining the respective adaptive per-coordinate threshold based on a sum of an exponential average of past and current gradients and a previous adaptive per-coordinate threshold. In some examples, determining the adaptive per-coordinate threshold for each of the plurality of coordinates of the gradient of the loss function comprises determining the respective adaptive per-coordinate threshold based at least in part on one or more previous adaptive per-coordinate thresholds for said coordinate and an exponential moving average of past gradients raised to an alpha moment value. In some examples, determining the adaptive per-coordinate threshold for each of the plurality of coordinates of the gradient of the loss function comprises determining the respective adaptive per-coordinate threshold based at least in part on an exponential moving average of past gradients and the respective previous adaptive per-coordinate threshold for the said coordinates.

At 206, the computing system can clip a respective current first moment for each coordinate based at least in part on the respective adaptive per-coordinate threshold for said coordinate.

At 208, the computing system can obtain a current update value for each coordinate of the gradient of the loss function based on the respective clipped current first moment.

At 210, the computing system can update a set of values for the plurality of parameters of the machine-learned model based at least in part on a respective previous value for each of the plurality of parameters, the current update value for each coordinate, and a learning rate.

After 210, method 200 can optionally return to 202 and again determine a gradient of the loss function evaluated for the machine-learned model with respect to a different batch of training data. Thus, in some implementations, method 200 can be performed iteratively. The iterative look can stop when one or more stopping criteria are met. The stopping criteria can be any number of different criteria including as examples, a loop counter reaching a predefined maximum, iteration over iteration change in parameter adjustments falling below a threshold, the gradient being below a threshold value, and/or various other criteria.

Figure 3A:
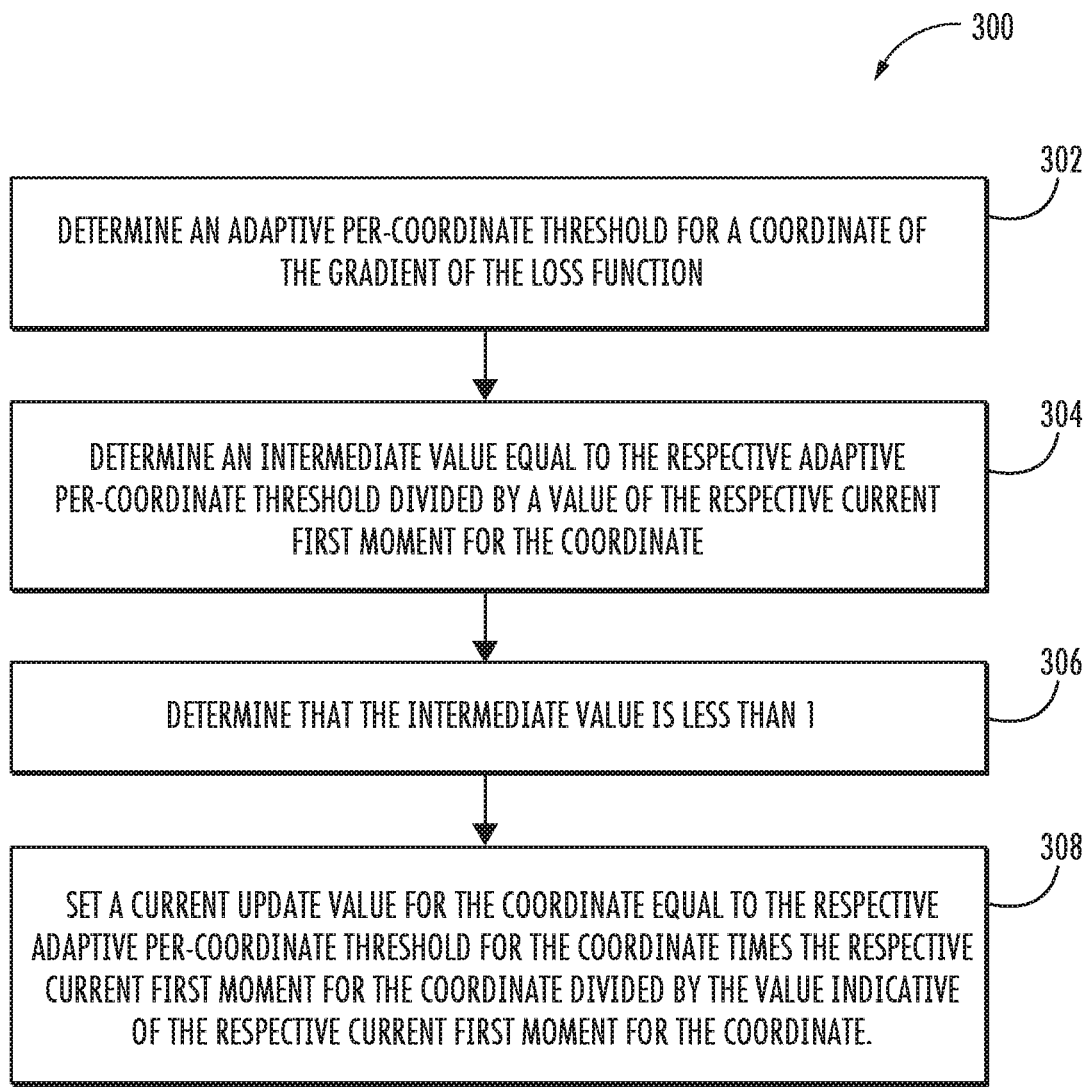
FIG. 3A depicts a flow chart diagram of an example method to determine a current update value according to example embodiments of the present disclosure.

FIG. 3A depicts a flow chart diagram of an example method to determine a current update value according to example embodiments of the present disclosure. Although FIG. 3A depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, the computing system can determine a respective adaptive per-coordinate threshold for each of the plurality of coordinates of the gradient of the loss function. In some examples, the respective adaptive per-coordinate threshold for each coordinate is based at least in part on a previous adaptive per-coordinate threshold for the coordinate and the gradient of the loss function.

At 304, the computing system can determine an intermediate value equal to the adaptive per-coordinate threshold divided by a value indicative of the respective current first moment.

At 306, the computing system can determine that the intermediate value is less than 1. Based on determining that the intermediate value is less than 1, at 308, the computing system can determine a current update value for the respective coordinate by setting the current update for said coordinate equal to the respective adaptive per-coordinate threshold times the respective current first moment divided by the value indicative of the respective current first moment for the coordinate.

Figure 3B:
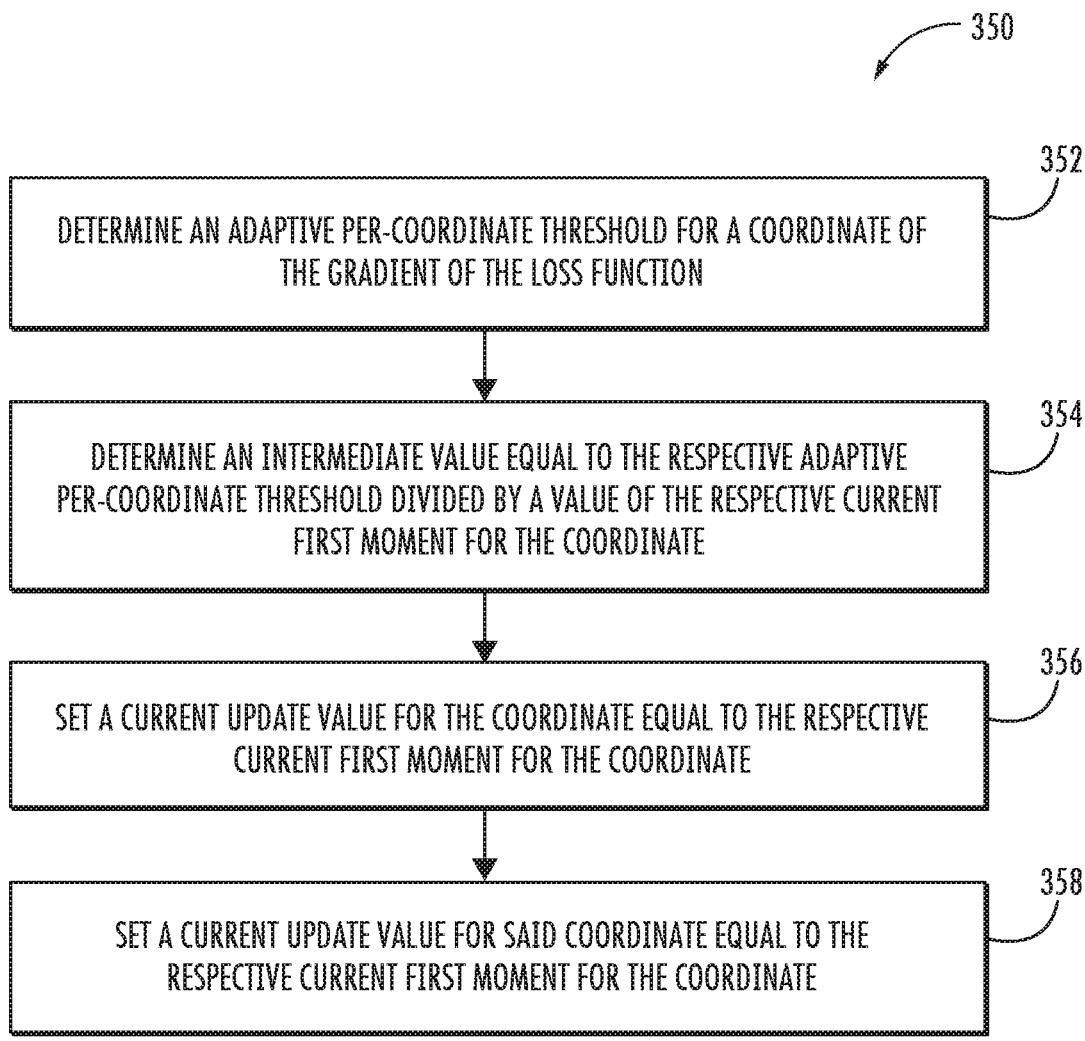
FIG. 3B depicts a flow chart diagram of an example method to determine a current update value according to example embodiments of the present disclosure.

FIG. 3B depicts a flow chart diagram of an example method to determine a current update value according to example embodiments of the present disclosure. Although FIG. 3B depicts steps performed in a particular order for purposes of illustration and discussion, the methods of the present disclosure are not limited to the particularly illustrated order or arrangement. The various steps of the method 350 can be omitted, rearranged, combined, and/or adapted in various ways without deviating from the scope of the present disclosure.

At 352, the computing system can determine a respective adaptive per-coordinate threshold for each of the plurality of coordinates of the gradient of the loss function. In some examples, the respective adaptive per-coordinate threshold for each coordinate is based at least in part on a previous adaptive per-coordinate threshold for the coordinate and the gradient of the loss function.

At 354, the computing system can determine an intermediate value equal to the adaptive per-coordinate threshold divided by a value indicative of the respective current first moment.

At 356, the computing system can determine that the intermediate value is less than 1. Based on determining that the intermediate value is greater than 1, at 358, the computing system can determine a current update value for the respective coordinate by setting the current update for said coordinate equal to the respective current first moment for said coordinate.

Example Discussion of Experimental Results

A significant factor for the difference in Adam and SGD performance on BERT and ImageNet comes from the distribution of the heavy tailed distribution of stochastic gradients. There has been little study of the actual stochastic gradient noise distributions in neural network training. To understand gradient noise and its effects, the present disclosure treats noise as a high dimensional vector instead of treating deviations in each coordinate as scalar noises to estimate tail index. Further, the present disclosure focuses on the convergence of optimization algorithms and how heavy tailed gradient noise norm affects optimization and convergence instead of focusing on the consistence of the index estimator.

Figure 4A:
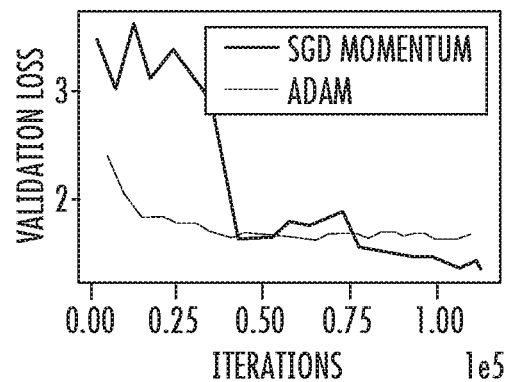
FIGS. 4A-F depict example experimental results according to example embodiments of the present disclosure.
Figure 4B:
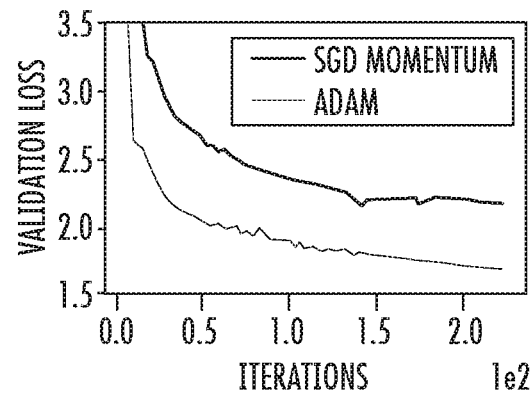

The present disclosure compares noise distributions while training two deep learned models, namely BERT on Wikipedia dataset and ResNet on ImageNet. For example, FIG. 4A depicts a histogram comparing the Validation Loss for ResNet trained on ImageNet for SGD and Adam. SGD with momentum clearly outperforms Adam. FIG. 4B depicts a histogram comparing the Validation Loss for $BERT_{base}$ pretraining between SGD and Adam with momentum. Although the hyperparameters for SGD momentum are fine-tuned, there is still a large performance gap between SGD and Adam.

Figure 4C:
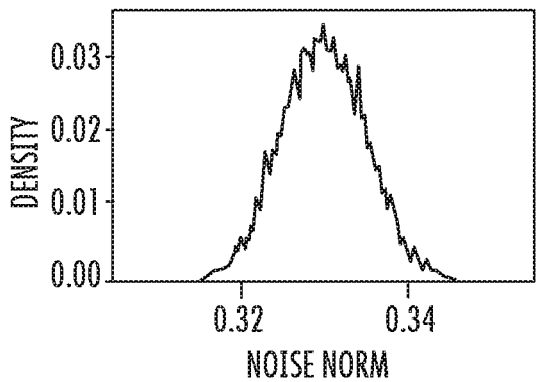
Figure 4D:
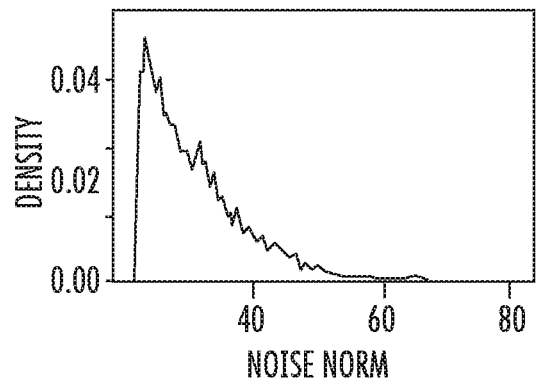

For ResNet trained on ImageNet, the gradient norms of the mini batch gradients are typically quite small and well concentrated around the centers, whereas for BERT these gradient norms take a wide range of values which are sometimes much larger than their means. For example, while training BERT and ResNet, the gradient noise norm can be computed as $\|g-\nabla f(x)\|$, where g is the stochastic gradient computed from a minibatch sample. When plotted, the gradient noise norm of BERT appears to be heavy tailed, whereas that of ResNet appears to be Gaussian (with a well concentrated center) in nature. FIGS. 4C and 4D are histograms depicting the gradient noise norm for ResNet and BERT respectively. It can be observed that the noise distribution for BERT appears to be heavy-tailed whereas the noise distribution for ResNet is well concentrated in the center.

Figure 4E:
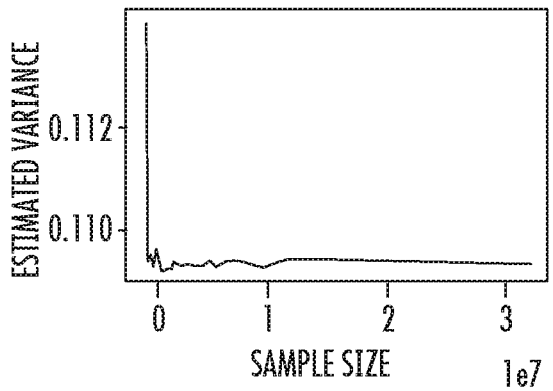
Figure 4F:
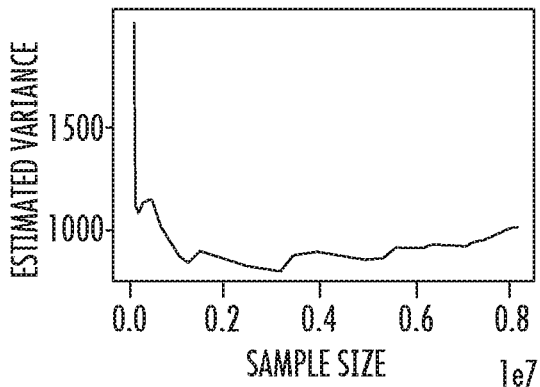

FIGS. 4E and 4F depict histograms indicative of the estimation of variance of stochastic gradients (i.e.

$$\frac{1}{n}\sum_{i=1}^{n} \|g_i - \Delta f(x)\|^2$$

with respect to the sample size used in the estimation of variance in stochastic gradients while training BERT and ResNet respectively. As can be seen from the figures, while the corresponding estimator converges for Imagenet, the empirical variance does not converge in BERT training even as the sample size approaches $10^7$. Thus, heavy tailed noise distribution of the gradients is one of the main aspects that determines the performance of SGD and adaptive methods.

FIG. 5 depicts a table indicative of error bounds for strongly convex and non-convex functions after k iterations using SGD, GClip, and CClip. As disclosed herein, gradient clipping ensures convergence for both convex and non-convex functions under heavy-tailed noise. As seen in FIG. 5, for α-moment $[\|g(x)\|^\alpha] \leq G^\alpha$ (Assump 1) and coordinate-wise moments $[\|g_i(x)\|^\alpha] \leq B_i^\alpha$ (Assump 2), which satisfy $G^2 \leq dB_\alpha^2$, in the standard setting (α=2), GClip recovers the optimal rates of SGD. For heavy-tailed noise (α∈(1,2)), GClip converges both for convex and non-convex functions, whereas the proof for SGD fails, denoted as N/A. However, under a more fine-grained noise model, CClip has better convergence rates as compared to both SGD and GClip. Further, matching lower-bounds for all α∈(1,2] prove the optimality of clipping methods over other SGD methods.

A more detailed comparison between ImageNet and BERT training is provided to analyze the cause of the heavy-tailedness and show that both the architecture and the data play a role in the difference in performance of the different algorithms. For example, a comparison of ACClip on BERT per-training and fine-tuning tasks demonstrate ACClip's advantages over Adam.

Important to understanding the impact of heavy tailed gradient noise norm is understanding the effect of model architecture and training data on the shape of gradient noise, and to understand how this shape evolves during training. To understand the effect of model architecture on the shape of gradient noise, the noise distribution in an Attention and a ResNet-like model on both Wikipedia and synthetic Gaussian data can be studied. Using BERTbase model as the Attention model, and the ResNet is constructed by removing the self-attention modules in the transformer blocks. Gaussian synthetic data is generated by replacing the token embedding layer with normalized Gaussian input. From the models, heavy-tailed noises are observed in the Attention model independently of the input data. For the ResNet model, it can be observed that Gaussian input leads to Gaussian noise while Wikipedia data makes the noise to be heavy-tailed. Therefore, the noise pattern results from both the model architecture as well as the data distribution.

During training, the noise distribution is non-stationary during BERT training as the noise is becoming increasingly more concentrated. In contrast, for the ResNet model on ImageNet, the shape of the noise distribution remains almost unchanged. This result supports the use of exponential moving average as an estimator for the underlying non-stationary distribution to accelerate optimization.

To evaluate the empirical performance of the proposed ACClip algorithm, a comparison of ACClip and Adam on BERT pre-training as well fine-tuning using the SQUAD v1.1 dataset is performed. Adam optimizer can be used and the same training setup as in the BERT paper Devlin et al. For ACClip, setting lr=1e-4, $\beta_1$=0.9, $\beta_2$=0.99, $\epsilon$=1e-5, and wd=1e-5, can be performed to compare the performance between ACCLip and Adam on both setups on BERT models of three different sizes, BERTbase with 6 and 12 layers as well as BERTlarge with 24 layers.

FIG. 6A depicts a table including a comparison of Validation Loss and LM Accuracy between Adam and ACClip for $BERT_{base}$ with 6 layers, 12 layers, and 24 layers. As can be seen from FIG. 6A, ACClip achieves lower loss and higher masked-LM accuracy for all model sizes.

FIG. 6B depicts a table including a comparison of the mean and standard deviation of F1 and exact match score for 5 runs on the SQUAD v1.1 dev set. Even for these metrics, the proposed algorithm outperforms Adam for both F1 and an exact match on all model sizes when evaluated on the SQUAD v1.1 fine-tuning task. The experimental results on BERT pretraining and fine-tuning indicate the effectiveness of the proposed algorithm over Adam and other SGD based optimization techniques.

Figure 7:
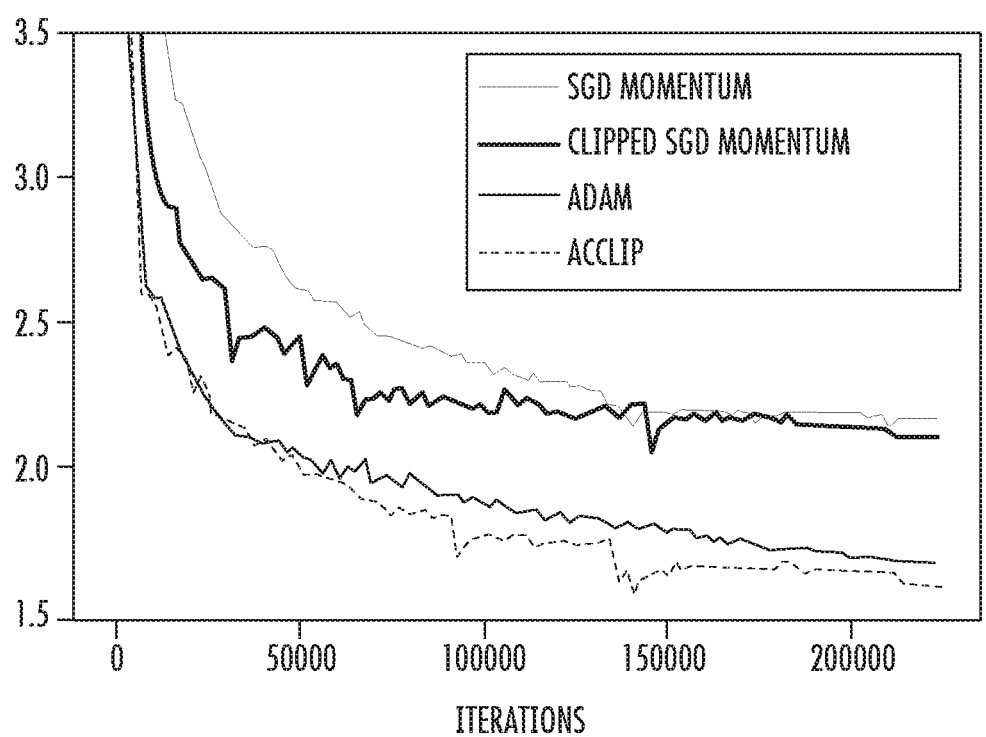
FIG. 7 depicts example experimental results according to example embodiments of the present disclosure.

FIG. 7 depicts a histogram indicating the validation loss for pretraining $BERT_{base}$ using SGD momentum, GClip, Adam, and ACClip. After performing a hyper-parameter search for all three algorithms, SGD, Adam, and ACClip, it is observed that even after extensive tuning, there remains a large gap between (clipped) SGD momentum and adaptive methods. Furthermore, clipped SGD achieves faster convergence as well as lower final loss compared to standard SGD. Lastly, the proposed optimizer ACClip achieves a lower loss than the Adam. Thus, ACClip achieves lower loss and higher masked-LM accuracy for all model sizes.

ADDITIONAL DISCLOSURE

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for training machine-learned models with improved convergence properties, the method comprising:
    training, by one or more computing devices, a machine-learned model by:
        determining, by the one or more computing devices, a gradient of a loss function that evaluates a performance of the machine-learned model, wherein the gradient of the loss function comprises a plurality of coordinates that respectively correspond to a plurality of parameters of the machine-learned model;
        determining, by the one or more computing devices, a respective adaptive per-coordinate threshold for each of the plurality of coordinates of the gradient of the loss function, wherein the respective adaptive per-coordinate threshold for each coordinate is based at least in part on a previous adaptive per-coordinate threshold for the coordinate and the gradient of the loss function;
        clipping, by the one or more computing devices, a respective current first moment for each of the plurality of coordinates of the gradient of the loss function based at least in part on the respective adaptive per-coordinate threshold for the coordinate;
        generating, by the one or more computing devices, a plurality of current update values respectively for the plurality of coordinates using, for each of the plurality of coordinates, the clipped respective current first moment for the coordinate; and
        updating, by the one or more computing devices, the plurality of parameters of the machine-learned model using the plurality of current update values.

2. The computer-implemented method of claim 1, wherein determining, by the one or more computing devices, the respective adaptive per-coordinate threshold for each of the plurality of coordinates of the gradient of the loss function comprises determining the respective adaptive per-coordinate threshold based on a sum of an exponential average of past and current gradients and a previous adaptive per-coordinate threshold for the coordinate.

3. The computer implemented method of claim 1, wherein clipping, by the one or more computing devices, the respective current first moment for each of the plurality of coordinates of the gradient of the loss function based at least in part on the respective adaptive per-coordinate threshold for the coordinate to obtain the current update value for the coordinate comprises, upon determining that the respective adaptive per-coordinate threshold divided by a value indicative of the respective current first moment for the coordinate is less than 1, setting the current update value for the coordinate equal to the respective adaptive per-coordinate threshold for the coordinate times the respective current first moment for the coordinate divided by the value indicative of the respective current first moment for the coordinate.

4. The computer implemented method of claim 1, wherein clipping, by the one or more computing devices, the respective current first moment for each of the plurality of coordinates of the gradient of the loss function based at least in part on the respective adaptive per-coordinate threshold for the coordinate to obtain the current update value for the coordinate comprises, upon determining that the respective adaptive per-coordinate threshold divided by a value indicative of the current first moment for the coordinate is greater than 1, setting the current update value for the coordinate equal to the respective current first moment for the coordinate.

5. The computer implemented method of claim 1, wherein the respective current first moment for each of the plurality of coordinates is based at least in part on a respective previous current moment for the coordinate and the gradient of the loss function.

6. The computer-implemented method of claim 1, wherein determining, by the one or more computing devices, the respective adaptive per-coordinate threshold for each of the plurality of coordinates of the gradient descent of the loss function is based at least in part on an exponential moving average of past gradients for the coordinate.

7. The computer-implemented method of claim 1, further comprising: performing, by the one or more computing devices, the method of claim 1 for each of a plurality of iterations.

8. The computer-implemented method of claim 1, wherein the learning rate is constant for each iteration.

9. The computer-implemented method of claim 1, wherein clipping comprises placing a bound on an exponential moving average of past gradients with an initial value of an alpha moment as 1.

10. The computer implemented method of claim 1, wherein a noise distribution for the gradient of the loss function is heavy-tailed.

11. The computer implemented method of claim 1, wherein the machine-learned model is an attention model.

12. A computer system comprising:
one or more processors; and
one or more non-transitory computer-readable media that store instructions that, when executed by the one or more processors, cause the one or more processors to perform operations, the operations comprising:
training, by one or more computing devices, a machine-learned model by:
determining a gradient of a loss function that evaluates a performance of a machine-learned model that comprises a plurality of parameters, wherein the gradient of the loss function comprises a plurality of coordinates that respectively correspond to the plurality of parameters;
determining a respective adaptive per-coordinate threshold for each of the plurality of coordinates of the gradient of the loss function, wherein the respective adaptive per-coordinate threshold for each coordinate is based at least in part on a previous adaptive per-coordinate threshold for the coordinate and the gradient of the loss function;
clipping a respective current first moment for each of the plurality of coordinates of the gradient of the loss function based at least in part on the respective adaptive per-coordinate threshold for the coordinate;
generating, by the one or more computing devices, a plurality of current update values respectively for the plurality of coordinates using, for each of the plurality of coordinates, the clipped respective current first moment for the coordinate; and
updating, by the one or more computing devices, the plurality of parameters of the machine-learned model using the plurality of current update values.

13. The computing system of claim 12, wherein determining the respective adaptive per-coordinate threshold for each of the plurality of coordinates of the gradient of the loss function comprises determining the respective adaptive per-coordinate threshold based on a sum of an exponential average of past and current gradients and a previous adaptive per-coordinate threshold.

14. The computing system of claim 12, wherein clipping the respective current first moment for each of the plurality of coordinates of the gradient of the loss function based at least in part on the respective adaptive per-coordinate threshold for the coordinate to obtain the current update value for the coordinate comprises, upon determining that the respective adaptive per-coordinate threshold divided by a value indicative of the respective current first moment for the coordinate is less than 1, setting the current update value for the coordinate equal to the respective adaptive per-coordinate threshold for the coordinate times the respective current first moment for the coordinate divided by the value indicative of the respective current first moment for the coordinate.

15. The computing system of claim 12, wherein clipping the respective current first moment for each of the plurality of coordinates of the gradient of the loss function based at least in part on the respective adaptive per-coordinate threshold for the coordinate to obtain the current update value for the coordinate comprises, upon determining that the respective adaptive per-coordinate threshold divided by a value indicative of the current first moment for the coordinate is greater than 1, setting the current update value for the coordinate equal to the respective current first moment for the coordinate.

16. The computing system of claim 12, wherein the respective current first moment for each of the plurality of coordinates is based at least in part on a respective previous current moment for the coordinate and the gradient of the loss function.

17. One or more non-transitory computer-readable media that store a machine-learned model that has been trained through execution of operations, the operations comprising:
training, by one or more computing devices, a machine-learned model by:
for each of a plurality of iterations:
determining a gradient of a loss function that evaluates a performance of the machine-learned model that comprises a plurality of parameters, wherein the gradient of the loss function comprises a plurality of coordinates that respectively correspond to the plurality of parameters;

determining a respective adaptive per-coordinate threshold for each of the plurality of coordinates of the gradient of the loss function, wherein the respective adaptive per-coordinate threshold for each coordinate is based at least in part on a previous adaptive per-coordinate threshold for the coordinate and the gradient of the loss function;

clipping a respective current first moment for each of the plurality of coordinates based at least in part on the respective adaptive per-coordinate threshold for the coordinate;

generating, by the one or more computing devices, a plurality of current update values respectively for the plurality of coordinates using, for each of the plurality of coordinates, the clipped respective current first moment for the coordinate; and updating, by the one or more computing devices, the plurality of parameters of the machine-learned model using the plurality of current update values.

18. The one or more non-transitory computer-readable media of claim 17, wherein determining the respective adaptive per-coordinate threshold for each of the plurality of coordinates of the gradient of the loss function comprises determining the respective adaptive per-coordinate threshold based on a sum of an exponential average of past and current gradients and a previous adaptive per-coordinate threshold.

19. The one or more non-transitory computer-readable media of claim 17, wherein clipping the respective current first moment for each of the plurality of coordinates based at least in part on the respective adaptive per-coordinate threshold for the coordinate to obtain the current update value for the coordinate comprises, upon determining that the adaptive per-coordinate threshold divided by a value indicative of the respective current first moment for the coordinate is less than 1, setting the current update value for the coordinate equal to the respective adaptive per-coordinate threshold for the coordinate times the respective current first moment for the coordinate divided by the value indicative of the respective current first moment for the coordinate.

20. The one or more non-transitory computer-readable media of claim 17, wherein clipping the respective current first moment for each of the plurality of coordinates based at least in part on the respective adaptive per-coordinate threshold for the coordinate to obtain the current update value for the coordinate comprises, upon determining that the respective adaptive per-coordinate threshold divided by a value indicative of the current first moment for the coordinate is greater than 1, setting the adaptive per-coordinate threshold for said coordinate equal to the respective current first moment for the coordinate.

* * * * *